(12) United States Patent
Gorelik et al.

(10) Patent No.: US 10,917,467 B1
(45) Date of Patent: *Feb. 9, 2021

(54) OBJECT SUBSCRIPTION RULE PROPAGATION

(71) Applicant: Amazon Technologies, Inc., Seattle, WA (US)

(72) Inventors: Igor Gorelik, Irvine, CA (US); Rosen Ognyanov Baklov, Lake Forest, CA (US); Pablo Puo Hen Cheng, Pomona, CA (US); Jesse Aaron Van Beurden, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/160,202

(22) Filed: Oct. 15, 2018

Related U.S. Application Data

(63) Continuation of application No. 14/859,166, filed on Sep. 18, 2015, now Pat. No. 10,104,173.

(51) Int. Cl.
*H04N 21/20* (2011.01)
*H04L 29/08* (2006.01)
*G06F 16/958* (2019.01)
*G06F 16/182* (2019.01)
*H04N 21/218* (2011.01)
*G06F 16/10* (2019.01)

(52) U.S. Cl.
CPC .......... *H04L 67/1095* (2013.01); *G06F 16/10* (2019.01); *G06F 16/1834* (2019.01); *G06F 16/958* (2019.01); *H04N 21/20* (2013.01); *H04N 21/218* (2013.01)

(58) Field of Classification Search
CPC .... G06F 16/10; G06F 16/1834; G06F 16/958; G06F 17/30303; G06F 17/30317; G06F 17/3089; G06F 9/542; H04L 67/1095; H04L 67/2823; H04N 21/20; H04N 21/218; A63F 13/10; G06Q 30/02; G06Q 30/0601; G06T 19/20
See application file for complete search history.

(56) References Cited

U.S. PATENT DOCUMENTS

| | | |
|---|---|---|
| 8,271,651 B1 | 9/2012 | Wang et al. |
| 9,229,657 B1 | 1/2016 | Rus et al. |
| 9,501,915 B1 | 11/2016 | Laska et al. |
| 2002/0095403 A1 | 7/2002 | Chandrasekaren et al. |
| 2002/0095454 A1* | 7/2002 | Reed ............... G06Q 30/0601 709/201 |

(Continued)

*Primary Examiner* — Le H Luu
(74) *Attorney, Agent, or Firm* — BakerHostetler

(57) ABSTRACT

A computing system implemented method is disclosed for distributing data objects in a network of computing nodes. Each node has stored thereon subscription rules defining characteristics of data objects that the particular node may require during processing. The nodes exchange their subscription rules with other nodes in the network. Each node then compares the rules received from other nodes with the attributes of data objects stored on the particular node. Where a rule set matches the attributes of a data object stored thereon, the node marks the particular data object for copying to the node from which the particular rule set was received. The marked data object is then copied to the appropriate node.

20 Claims, 10 Drawing Sheets

(56) References Cited

U.S. PATENT DOCUMENTS

| | | | |
|---|---|---|---|
| 2003/0115434 A1 | 6/2003 | Mahalingam et al. | |
| 2003/0177187 A1* | 9/2003 | Levine | A63F 13/10 |
| | | | 709/205 |
| 2004/0103182 A1* | 5/2004 | Krabel | G06F 16/215 |
| | | | 709/223 |
| 2004/0117345 A1 | 6/2004 | Bamford et al. | |
| 2004/0117377 A1* | 6/2004 | Moser | G06F 16/254 |
| 2005/0060275 A1* | 3/2005 | Steuernagel | G06F 16/2365 |
| 2005/0278731 A1 | 12/2005 | Cameron et al. | |
| 2006/0069702 A1* | 3/2006 | Moeller | G06F 9/542 |
| 2006/0149516 A1 | 7/2006 | Bond et al. | |
| 2006/0265554 A1 | 11/2006 | Carter et al. | |
| 2007/0097959 A1 | 5/2007 | Taylor | |
| 2007/0149216 A1 | 6/2007 | Misikangas | |
| 2008/0033812 A1* | 2/2008 | McKenna | G06Q 30/02 |
| | | | 717/116 |
| 2008/0168390 A1 | 7/2008 | Benyamin | |
| 2009/0254601 A1* | 10/2009 | Moeller | G06F 9/542 |
| | | | 709/201 |
| 2010/0235409 A1 | 9/2010 | Roy et al. | |
| 2011/0055210 A1 | 3/2011 | Meredith et al. | |
| 2011/0126131 A1 | 5/2011 | Baszucki | |
| 2011/0161451 A1 | 6/2011 | Hum et al. | |
| 2011/0191628 A1 | 8/2011 | Noguchi et al. | |
| 2013/0044106 A1* | 2/2013 | Shuster | G06T 19/20 |
| | | | 345/419 |
| 2013/0121263 A1 | 5/2013 | Nguyen et al. | |
| 2013/0283146 A1* | 10/2013 | Barak | G06F 16/958 |
| | | | 715/234 |
| 2013/0346572 A1 | 12/2013 | Jain et al. | |
| 2014/0228115 A1 | 8/2014 | Kaplan | |
| 2014/0359230 A1 | 12/2014 | Arora et al. | |
| 2015/0382059 A1 | 12/2015 | Mano | |

* cited by examiner

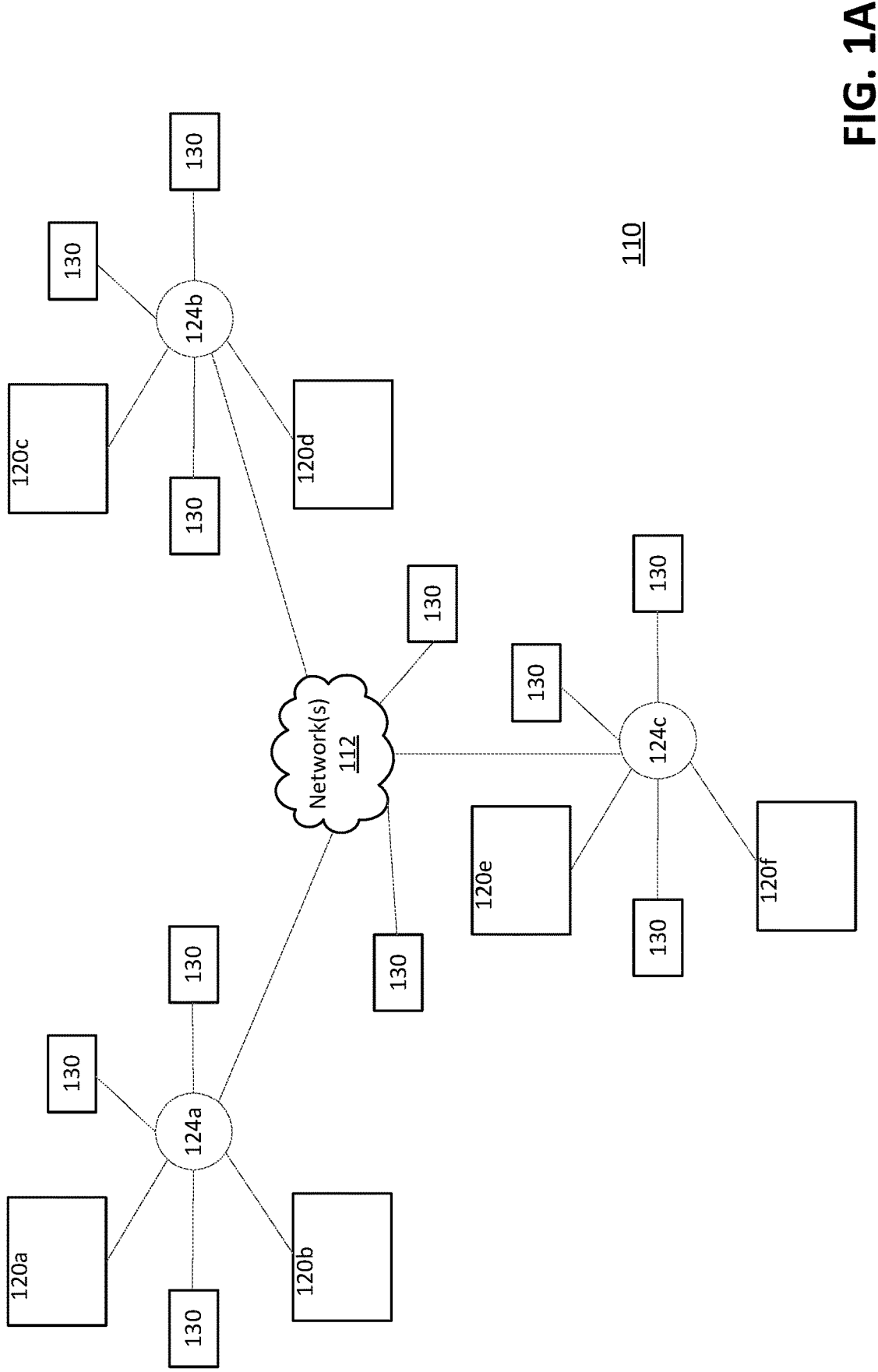

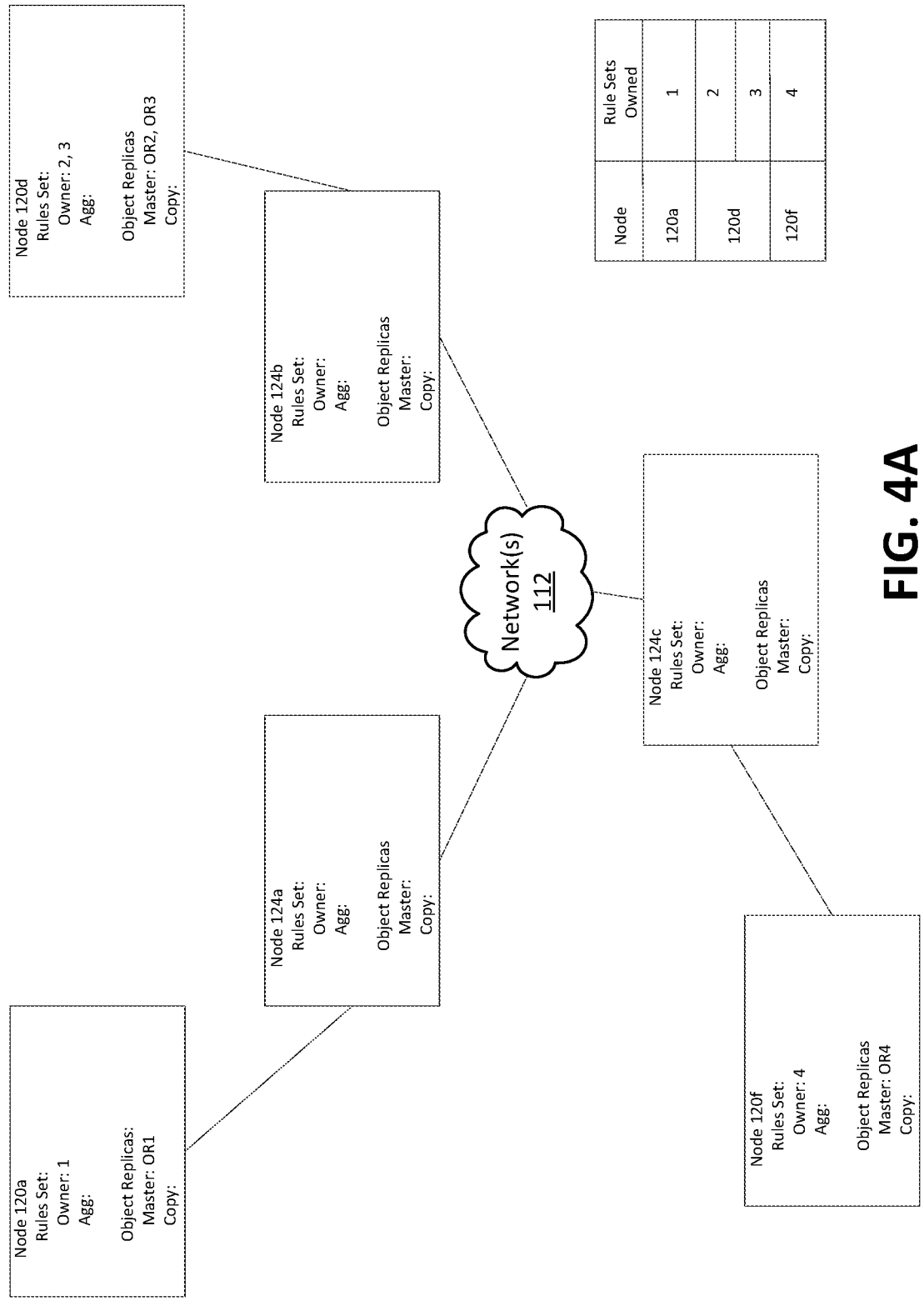

OBJECT SUBSCRIPTION RULE PROPAGATION

CROSS REFERENCE TO RELATED APPLICATIONS

The present application is a continuation of, and claims priority to U.S. patent application Ser. No. 14/859,166, entitled "OBJECT SUBSCRIPTION RULE PROPAGATION", filed Sep. 18, 2015, the entirety of which is hereby incorporated by reference.

BACKGROUND

In network environments comprising a plurality of computing nodes, it is frequently the situation that multiple nodes in a computing system require access to the same data object. For example, in a network environment that provides on-line gaming services, multiple computing nodes in the network may require access to a single data object representing the state of a particular player or object in a game scene.

One methodology for providing multiple computing nodes with access to a single data object is to replicate the data object on all nodes in the network. In other words, a copy of the data object is made on each node in the network. By providing a copy of the data object on all computing nodes in the network, each of the nodes has ready access to the data object.

BRIEF DESCRIPTION OF DRAWINGS

The following description of the illustrative embodiments may be better understood when read in conjunction with the appended drawings. It is understood that potential embodiments of the disclosed systems and methods are not limited to those depicted.

FIG. 1A depicts an example computer network.

FIGS. 4A-C depict an example progression of subscription rules and data objects in a multi-node environment.

DETAILED DESCRIPTION

Figure 1B:
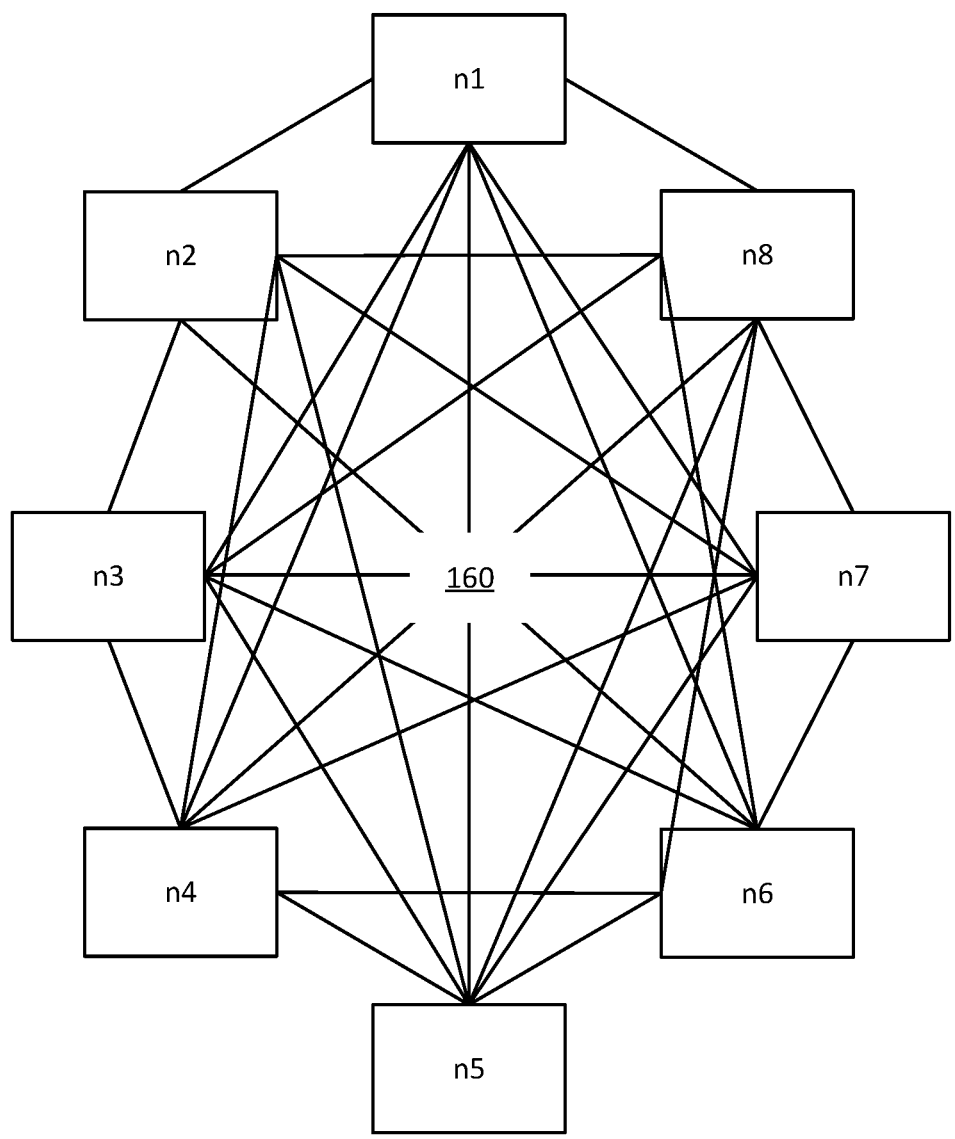
FIG. 1B depicts an example computing network.

In a typical data object replication model for copying data objects in a distributed computing environment, copies of data objects are made on each node in the network. Accordingly, when a new object is created in the network of nodes, a copy of the new object is distributed across the network to each node. When a change occurs to an existing data object, that change is communicated to all of the copies, which may be referred to as replicas, existing on all of the nodes in the network.

As the number of objects in a system increases and the number of computing nodes in the system increases, the amount of network and computing bandwidth needed to distribute data objects and updates to data object increases dramatically. The bandwidth devoted to distributing and updating data objects may become so large that it interferes with the processing for which the network was intended.

Applicants disclose herein systems and methods for dynamically distributing data objects to those computing nodes that have an interest or need for a particular data object. Data objects are dynamically distributed based upon characteristics defining the types of objects that are of interest to particular computing nodes and the attributes of the data objects themselves. In an example embodiment, each of a plurality of computing nodes has stored thereon a set of rules, which may be referred to as subscription rules, defining characteristics of data objects that are suitable for distribution to the particular computing node. For example, a first computing node may have stored thereon a first set of rules defining characteristics of data objects that the first computing node may use during its processing. A second computing node may have stored thereon a second set of rules defining characteristics of data objects that the second computing node may use during its processing. In an example embodiment, each computing node in the network communicates the set of subscription rules stored thereon to the computing nodes that are communicatively coupled to the particular computing node. In an example scenario wherein three nodes are communicatively coupled, each communication node communicates its rules to the two nodes to which the node is attached.

Upon receipt of the subscription rules from the connected computing nodes, each computing node evaluates or compares the subscription rules to the attributes of data objects stored on the particular node. For example, in a scenario wherein a first computing node has received one set of subscription rules from a second computing node and one set of subscription rules from a third computing node, the first computing node compares the subscription rules received from the second and third computing nodes with the data objects on the first computing system. In a scenario where a second computing node has received a set of subscription rules from the first computing node and a set of subscription rules from the third computing node, the second computing node compares the subscription rules received from the first and third computing nodes with the data objects stored on the second computing system. The comparison comprises determining whether the characteristics defined by the rule sets correspond to or coincide with the attributes of the data objects. For example, a characteristic may specify a bounding box of a portion of a virtual space. Where the attribute, e.g., position data, of a data object representing a user are within the bounding box specified by the characteristics, the subscription rules may be said to match or correspond to the data object.

Where the computing node determines a particular subscription rule corresponds to the attributes of a data object, the computing node marks the particular data object for copying to the computing node to which the particular subscription rule applies. For example, in a scenario where a first computing node determines a subscription rule corresponding to a second computing node matches the attributes of a particular data object stored on the first node, the data object is marked by the first computing node for copying to the second computing node. In an example scenario where a second computing node determines a subscription rule corresponding to a third computing node matches the attributes of a particular data object stored on the second node, the particular data object is marked by the second computing node for copying to the third computing node.

The computing nodes subsequently copy the data objects that have been marked for copying to the computing nodes that correspond to the particular subscription rule sets that matched the data objects. In an example scenario, where a first computing node has marked a data object as matching a rule set corresponding to a second computing node, the first computing node communicates the particular data object for receipt at the second computing node. Similarly, where a second computing node has marked a data object as matching a rule set corresponding to the third computing node, the second computing node communicates the particular data object for receipt at the third computing node.

The processing of subscription rules and data object attributes is on-going and the movement of data objects is dynamic. As new subscription rule sets are received at the computing nodes, the nodes evaluate the received subscription rule sets against data objects stored thereon, mark nodes that match the received subscription rule sets, and forward the data objects that match the subscription rules to the computing nodes that correspond to the matching subscription rules. The dynamic distribution of data objects based upon matching of subscription rules to data object attributes allows for data objects to be copied to only those computing nodes that actually have a need for the data object, rather than distributing data objects to all nodes. Accordingly, network and processing bandwidth devoted to data object distribution is relatively minimal.

As an example, in a virtual environment, such as in a large multi-player game, the virtual environment or world may be hosted, created, and processed by a large number of computing nodes in communication with each other. These computing nodes may be responsible for simulating the many people, places, and things that exist in the virtual environment. Data objects are created and maintained on the computing nodes in order to store and process information relating to the people, places, and things in the virtual environment. For example, a particular data object stored in the system may comprise information about a particular player or person in the virtual world. Another data object may comprise data regarding a particular thing such as, for example, a building, a book, an armament, building, room, etc., that may exist in the virtual world. As actions are taken relative to people and things in the virtual world, the computing nodes process the actions and update the value of data objects that correspond to people or things in the virtual. In an example scenario, where a user throws a ball in the virtual world, a computing node that is responsible for the particular data object that corresponds to the ball in the virtual world, updates the data object to show the impact of the force on the ball. For example, the location of the data object in the virtual world may be changed.

In the context of an example virtual game world, the movement of people and things is dynamic. For example, a person or player in a virtual world may move from one virtual room to another, or from one virtual country to another. The person or player may take virtual things with them such as, for example, an armament or automobile. As these changes take place in the virtual world, corresponding changes are made to the corresponding data objects on the computing nodes. Such changes are sometimes the impetus for data objects to be moved or replicated to one or more additional computing nodes in the system. For example, where a person in the virtual world has moved to another room, it may increase the efficiency of the system if the data object that represents the particular person is replicated to the computing node on which the data object for the room exists. By way of further example, where a projectile flies across the world to another country, it may increase efficiency of the system if the data object that represents the projectile is replicated or copied to the computing node having data objects relating to the new location of the projectile. The systems and methods for propagating data objects as described herein provide an efficient mechanism for performing the movement of data objects.

Example Computing Network

FIG. 1A is a diagram illustrating an example computing network 110 suitable for propagating subscription rules and using the subscription rules to identify data objects for distribution. In an example scenario, computing network 110 may be adapted to provide an on-line service or functionality. For example, network 110 may be adapted to provide processing for on-line gaming. In such a scenario, requests from client devices may be processed by nodes on network 110 in order to provide simulation in support of an on-line game. Data objects may be used by the nodes in the network to represent objects in a virtual world depicted in an on-line game.

As shown in FIG. 1A, a plurality of computing systems 120a-f are communicatively coupled in any suitable manner, for example using a hub communication systems 124a-c. Other communication systems or architectures can be used, for example, as shown in FIG. 1B. Computing systems 120a-f may be programmed to provide processing relating to an on-line or cloud service. In an example embodiment, computing systems 120a-f may be programmed to operate as simulation servers as part of an on-line gaming service. In an example scenario, computing systems 120a-f may be programmed to perform physics calculations and simulate physical interactions between objects. Computing systems 120a-f may comprise any suitable combination of hardware and software. In an example scenario, computing systems 120a-f may be implemented using virtual servers in a web services computing environment.

Client computing systems 130 are likewise communicatively coupled to hub communication/computing systems 124a-c and are programmed to access services and data provided by network 110 and, in particular, by computing systems 120a-f. In an example embodiment wherein computing systems 120a-f are programmed to operate as simulation servers as part of an on-line gaming service, client computing systems 130 may be programmed to access data objects and processing provided by computing systems 120a-f. More particularly, client computing systems 130 may be used to play on-line games, the processing for which is provided by computing systems 120a-f. Client computing systems 130 may comprise any combination of hardware and software suitable to enable interfacing with computing systems 120a-f via hubs 124a-c. For example, client computing systems 130 may comprise user devices such as desktop or laptop computers, pad devices, and/or phone devices.

Client computing systems 130 may be communicatively coupled in any suitable manner to hub communication and computing systems 124a and computing systems 120a-f. In an example embodiment, client computing systems 130 may access hub communication and computing systems 124a and computing systems 120a-f via network 112, which may comprise the Internet and/or any similar network. According to another aspect of the disclosed embodiments, and as illustrated in FIG. 1A, a plurality of client computing systems 130 may be arranged with hub systems 124 in a hub-and-spoke configuration.

As shown in FIG. 1A, hub communication and computing systems 124a-c are communicatively coupled with computing systems 120, client systems 130, as well as with each other. Hub systems 124*a-c* are programmed to relay data between computing systems 120, between client computing systems 130 and computing systems 124*a-c*, and between hub systems 124. In an example scenario, hubs 124 are programmed to relay simulation results to client systems 130 which access gaming functionality on computing systems 124. In the example embodiment, the hub systems 124*a-c* may be communicatively coupled via network 112, which may comprise any suitable networking topology including the Internet. Hub systems 124 may comprise any suitable combination of computing hardware and software to provide the functionality as described herein. It will be appreciated that hub communication and computing systems 124 may be referred to herein by any suitable term including, for example, hub, hub system, hub computing system, hub communication system, hub communication and computing system, etc. It will be appreciated that while FIG. 1A depicts each computing system 120 being communicatively coupled to one hub, one or more computing systems 120 may be communicatively coupled to multiple communication hubs 124 in any suitable arrangement. In other words, each computing system 120 may be coupled to more than one communication hub 124. Moreover, and as noted in connection with FIG. 1B, each computing system 120 may be directly connected to one or more other computing systems 120 without use of a communication hub 124.

The communicative coupling allows for computing systems 120*a-f*, which may be associated with any one of the hub systems 124*a-c*, to communicate with other of the computing systems 120*a-f* which may be connected to another hub system 124*a-c*. In an example embodiment, computing systems 120*a-f*, client computing systems 130, and hub systems 124*a-c* are programmed to operate in peer-to-peer configuration relative to each other. Accordingly, any one computing system 120*a-f*, 130, and 124*a-c* may communicate messages and data to any other of computing systems 120*a-f*, 130, 124*a-c* in network 110.

In an example embodiment, computing systems 120*a-f*, hub systems 124*a-c*, and client computing systems 130 are addressable points within network 110 and may be referred to as network nodes. According to another aspect of the disclosed embodiments, systems or nodes 120, 124, and 130 may be configured to operate as a mesh network. In such an embodiment, each system or node in the network is programmed to relay data and messages to other nodes in the network. In an example embodiment depicted in FIG. 1A, data and instructions may be routed from one node in the network, e.g., computing system 120*a*, to another node in the network, e.g., computing system 120*d*, via the intermediate network nodes, e.g., hub systems 124*a* and 124*b*. FIG. 1B illustrates another example network arrangement of nodes which are arranged in a mesh network. As shown in FIG. 1B, nodes n1 through n8 that are connected via a mesh network 160. The specific topology can vary, and the network 160 may include any number of routers and other network devices. In an embodiment such as is shown in FIG. 1B, the nodes, which may be servers, may be coupled to each other without use of communication hubs. Further, each node may have communication connections with multiple hubs so as to facilitate direct communication. The network 160 may include one or more wide area networks (WANs) such as the Internet and/or one or more local area networks (LANs). Nodes n1 through n8 may be suitable computing devices such as servers having one or more processors and memory. Together, nodes n1 through n8 may form a multi-node computing environment that may execute applications that simulate various environments, such as in a multi-player video game. It should be appreciated that the network topology illustrated in FIG. 1B has been greatly simplified and that more networks and nodes may be utilized such as, for example, that depicted in FIG. 1A. These topologies and devices should be apparent to those skilled in the art. It should also be appreciated the example systems described in FIGS. 1A and 1B are merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server or other computing device may comprise any combination of hardware or software that can interact and perform the described types of functionality, including without limitation desktop or other computers, database servers, network storage devices and other network devices. In addition, the functionality provided by the illustrated functions indicated as modules may in some embodiments be combined in fewer modules or distributed in additional modules. Similarly, in some embodiments the functionality of some of the illustrated modules may not be provided and/or other additional functionality may be available.

Referring to the embodiment depicted in FIG. 1A, it will further be appreciated that in some example scenarios, computing systems 120, hubs 124, and user systems 130 may be distributed over significant distances and be geographically remote from each other. For example, hub 124*a* and simulation servers 120*a* and 120*b* may be located on the east coast of the United States, while hub 124*b* and simulation servers 120*c* and 120*d* may be located on the west coast of the United States. The processing disclosed herein is adapted to alleviate latency issues that may arise in such a scenario.

It will be appreciated that hubs 124 provide a buffer between the computing servers 120 and user systems 130 and may be programmed to selectively reassign user systems to improve system performance. The buffer formed by the communication hubs allows computing servers 120 to devote resources to providing a service without maintaining direct connections with user systems 130. Hubs 124 provide a layer of security between the client devices and the simulation servers and, due to their coupling with other hubs, reduce the possibility of a single point of failure preventing access to a simulation server. The buffer provided by hubs 124 allows computing servers 120 to be added and removed from the network without interfering with connections made by particular user systems 130. Accordingly, simulation capacity may be scaled independently of client capacity and may be scaled without exponentially increasing network traffic. User systems 130 may be switched between hubs so as to be connected to a hub that is already receiving information of particular interest from a computing server. For example, in a scenario wherein a user system 130 wishes to receive information relating to a particular subject or area of interest in a gaming environment, the communication hub 124 to which the particular user system 130 is currently connected may reassign or redirect the user system 130 to another communication hub 124 that is already receiving the information of interest. In other words, hubs 124 are programmed to switch connected user systems 130 to another hub 124 in the network that is most appropriate for the user system's current activity. By making such switches between hubs, the performance of the hubs and the network is improved, in addition to providing a better user experience.

Figure 2:
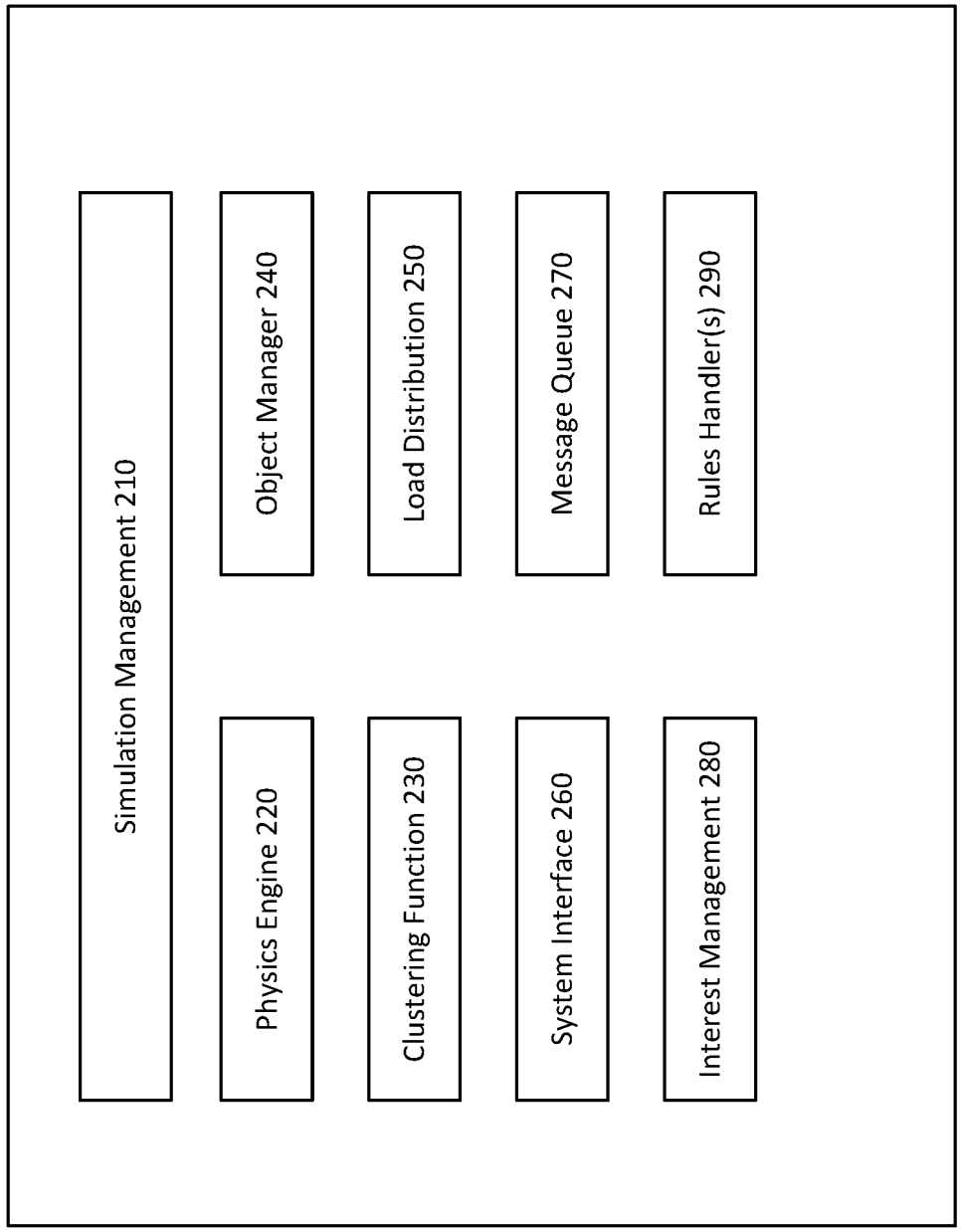
FIG. 2 depicts functional components of an example computing node.

FIG. 2 depicts a block diagram illustrating example functional components or modules that may be comprised in example computing systems 120a-f As shown, in an example embodiment, a computing system 120 may include, for example, a simulation management function or module 210 that may be configured to monitor and manage the various processes and functions for owning and simulating objects in the simulation scenario. Computing system 120 may also include a physics engine 220 configured to generate real-time simulation of objects including body dynamics and interactions with other objects. The physics engine 220 may be configured to simulate real world physics in multiple dimensions. The physics engine 220 may compute rigid body dynamics, soft body physics, and other dynamics depending on the application. In some example embodiments, a computing system 120 that provides simulation of objects may include a clustering function 230 for analyzing objects and, using a clustering algorithm, grouping objects based on input parameters and desired cluster characteristics.

In an example embodiment, a computing system 120 that provides simulation of objects may also include an object manager 240 configured to track and manage the various objects that are owned by the node as well as objects for which the node has replicas. A computing node 120 configured for simulation of objects may also include a load distribution function or module 250 that provides functionality for determining how to reallocate objects and distribute simulation processing loads among multiple nodes of the system. A computing node configured for simulation of objects may also include system interface functionality 260 that manages and coordinates communications with other nodes in the multi-node system. Messages for transmission or messages that have been received from other nodes may be queued in message queue 270 until they are processed. Additionally, in the case where there are ownership of an object for which the node has a replica may be changed, messages pertaining to the replica may be placed in message queue 270. Upon confirmation by the owner node of a change in ownership of the replica, queued messages from the new owning node may then be processed.

In an example embodiment, computing node 120 may still further comprise interest management module or function 280 and one or more rules handler modules 290. Rules hander modules 290 operate to process object subscription rule sets that may be received at a computing node 120. The rules handler modules 290 identify which rule sets have been received at a particular computing node. Interest management module 280 may be adapted to identify subscription rules that correspond to particular data objects on a computing system. Interest management module 280 marks the data objects that correspond to subscription rules for copying to the particular computing nodes that correspond to the applicable subscription rule. Data objects that are marked for copying may be copied to the appropriate computing node by object manager 240. Interest management module 280 in cooperation with rules handler modules 290 operates to minimize data transfer throughout the network by designating only those data objects that are needed by other nodes for communication across the network.

It will be appreciated that while FIG. 2 depicts the functional components or modules existing on a single computing node 120, each of a plurality of computing nodes in a network may comprise a similar set of functional modules. In an example embodiment, each computing node in a network of nodes uses its computing modules, perhaps in cooperation with the modules existing on other nodes, to provide the functionality as described herein.

Example Data Object Propagation

According to an aspect of the disclosed embodiments, data objects are dynamically distributed or replicated to nodes 120 in network 110 that have indicated an interest in the particular object.

In an example scenario, computing nodes 120 in network 110 have stored thereon rule sets defining characteristics of data objects that are suitable for distribution to the particular computing node. The rule sets may specify or quantify any type of characteristic that may be used to identify data objects suitable for delivery and use by computing nodes 120. For example, a subscription rule may specify a particular quality or characteristic of objects that should be transmitted to a corresponding computing node. In an example scenario wherein the service provided by the network 110 is on-line gaming, subscription rules may specify characteristics of objects used in a gaming sequence. For example, the subscription rules may specify characteristics defining: a particular area of a gaming space, e.g., a bounding box or circular area within a gaming space; characteristics defining a particular bit mask; and characteristics defining a particular type of object in the game, e.g., an object representing a portal, an object representing a sword, or an object representing a teammate. An example computing arrangement illustrating the use of rule sets defining characteristics of data object is depicted in connection with FIG. 4A. In FIG. 4A, a subset of the computing nodes depicted in FIG. 1A is illustrated along with example rule sets associated with particular computing nodes. As shown in FIG. 4A, computing node 120a has a subscription rule set number 1 stored thereon. Rule set number 1 is associated with node 120a and specifies characteristics of data objects that should be distributed to node 120a. Similarly, computing node 120d has stored thereon, and is the owner of rule sets numbers 2 and 3. Rule sets numbers 2 and 3 are associated with node 120d and specify characteristics of data objects that should be distributed to node 120d. Still further, computing node 120f has stored thereon, and is the owner of rule set number 4. Rule set number 4 is associated with node 120f and specifies characteristics of data objects that should be distributed to node 120f FIG. 4A comprises a chart that illustrates that rule set 1 corresponds to node 120a, rule sets 2 and 3 correspond to node 120d, and rule set 4 corresponds to node 120f.

Figure 3:
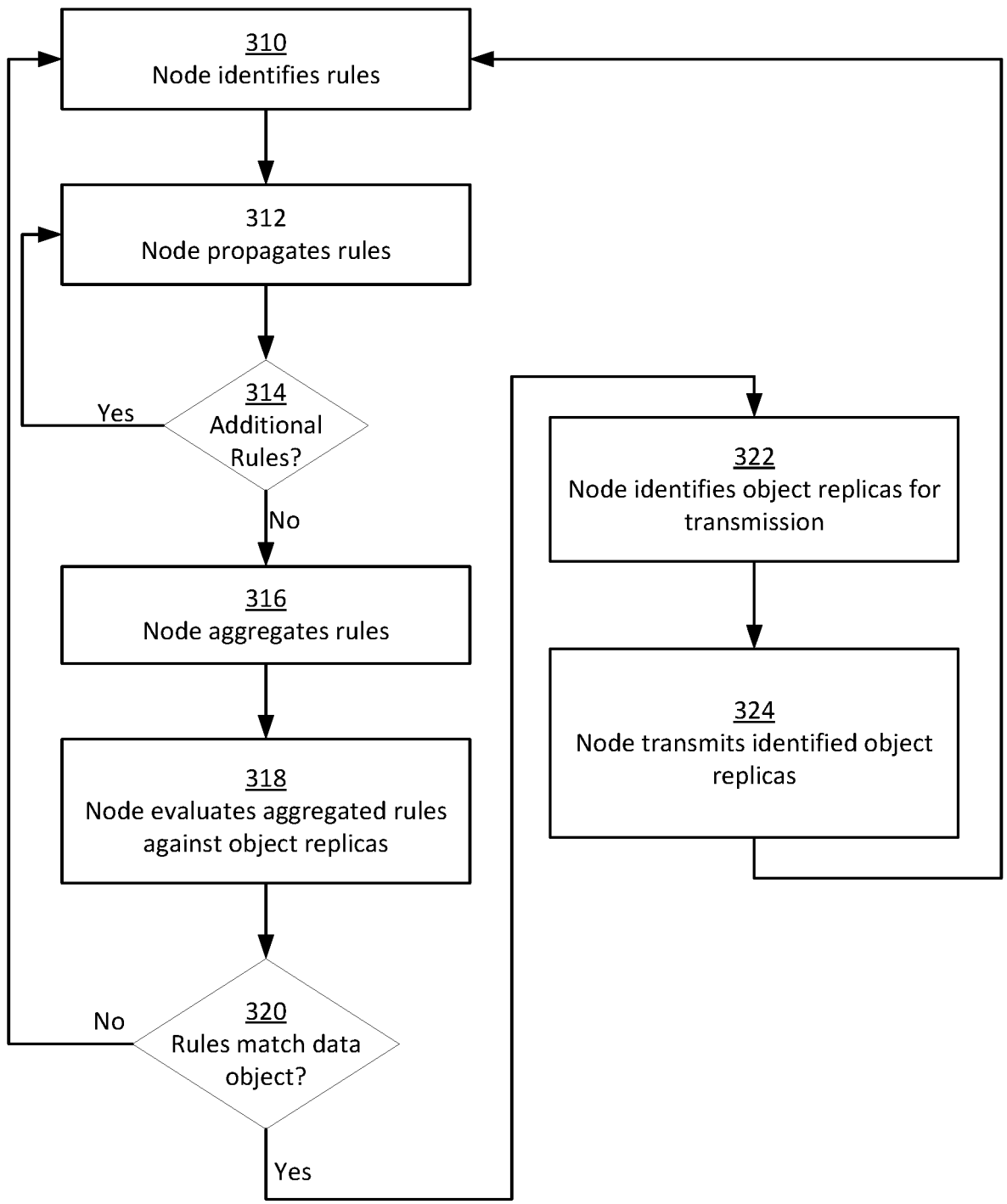
FIG. 3 depicts a flow diagram of example processing for propagating data objects in a multi-node environment.

FIG. 3 depicts a flow chart of example processing for identifying data objects for copying or replication in network 110. At block 310, computing nodes in network 110 identify the rule sets that are stored thereon. The processing may be performed, for example, by rules handler module 290. In an example scenario corresponding to that depicted in FIG. 4A, node 120a identifies that rule set number 1 is stored thereon, node 120d identifies that it has rule sets 2 and 3 stored thereon, and node 120f identifies that it has rule set 4 stored thereon.

At block 312, computing nodes in network 110 that have identified or determined themselves to have rules sets of characteristics thereon propagate the rule sets to other nodes in the network. In an example embodiment, computing nodes transmit their rule sets to computing nodes to which they are directly connected. Referring again to FIG. 4A, in an example scenario, computing node 120a, and in particular rules handler module 290 executing thereon transmits for receipt at computing node 124a subscription rule set number 1. Computing node 120d communicates rule sets 2 and 3 which are received at computing node 124*b*. Computing node 120*f* communicates rule set number 4 for receipt at computing node 124*c*.

When a computing node receives a rule set from another node, the computing node propagates the received rule set to other computing nodes. Accordingly, as shown at decision block 314, each computing node evaluates or determines whether or not additional rule sets have been received and require propagation. If so, processing continues at block 312 with the additional rule sets being transmitted. In an example embodiment, the computing nodes propagate the received rules sets to the computing nodes to which they have a direct connection, i.e., nodes that may be accessed without hopping other computing nodes. With reference to FIG. 4A, in an example scenario computing node 124*a* transmits for receipt at nodes 124*b* and 124*c* rule set number 1, which originated from computing node 120*a*. Similarly, node 124*b* transmits for receipt at nodes 124*a* and 124*c* subscription rule sets 2 and 3 which originated from computing node 120*d*. Still further, node 124*c* transmits for receipt at nodes 124*a* and 124*b* subscription rule 4 which was originally transmitted by computing node 120*f*.

Figure 4B:
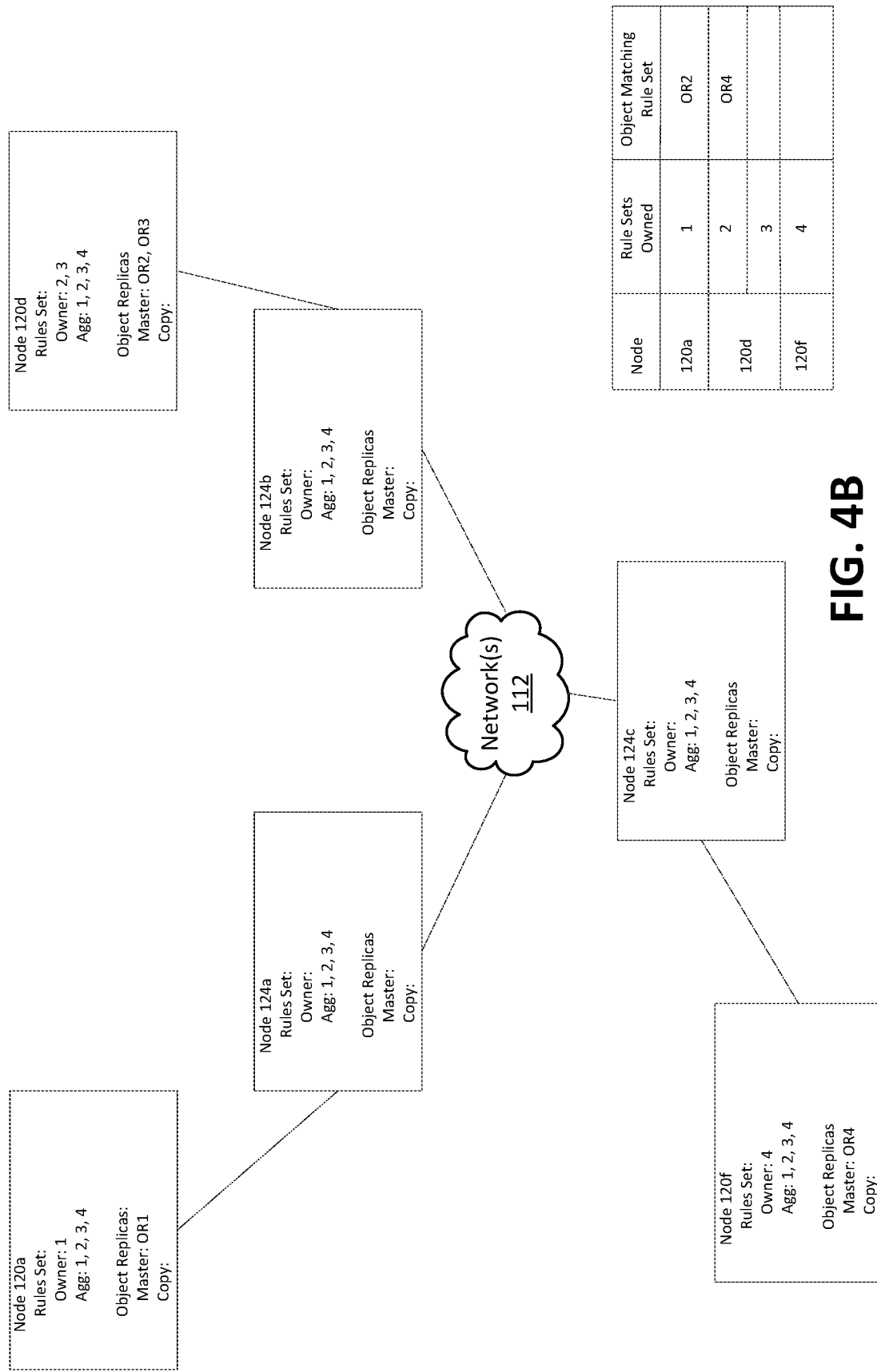

The propagation of rule sets from node to node continues until the rule sets have been propagated by all nodes to all nodes to which each node is attached. Referring to FIG. 3, processing continues between blocks 312 and 314 until no further rules require copying. FIG. 4B provides an illustration of the nodes depicted in FIG. 4A after the rule sets have been propagated. As shown, at the conclusion of the rule set propagation, each of the computing nodes in the network has a copy of each of the rule sets. Accordingly, each of the computing nodes has information specifying characteristics of object replicas that should be distributed to other of the computing nodes.

After processing at block 314 is complete, each of the computing nodes aggregates the rule sets that have been received at the particular computing node at block 316. In an example embodiment, the computing nodes generate a list comprising the rule sets originating from the particular computing node as well as any rule sets that were received and which correspond to other nodes in the network. The rules handler module 290 may be responsible for aggregating the rule sets. In an example embodiment, each rule set may have an associated type which corresponds to the characteristics the rule set relates. Further, in an example embodiment there may be a plurality of rules handler modules 290, with each rule set handler module 290 corresponding to a particular rule type. In such an embodiment, each rules handler module 290 generates a list of the rule sets that correspond to that particular type.

At block 318, each of the computing nodes evaluates the rule sets defining characteristics against the data objects on the particular computing node. Each of the computing nodes determines whether the rule sets correspond to or match the attributes of the data objects on the particular computing node. For example, in a scenario wherein a rule set defines characteristics of a particular bit map, the computing node evaluates each data object thereon to determine whether the particular data object contains or corresponds to the particular bit map. In a scenario wherein a rule set defines characteristics defining a space in a virtual gaming area, the computing node evaluates each data object thereon to determine whether the attributes of the particular data object indicate that the object is located in the defined space. It will be appreciated that the data objects stored on computing systems 120*a* may be copies of data objects, the originals of which are stored on another data object. Further, the data objects may be referred to as data object replicas or replicas as the data objects may represent replicated copies of an original or master replica.

The attributes that are used in the evaluation may have been previously defined for the data objects or may be generated dynamically by evaluating features of the particular data object. For example, in a scenario wherein the rule set defines characteristics specifying a particular bit map, the computing node may process the particular data object to determine whether it comprises the bit map specified in the rule set.

In an example scenario wherein multiple rules handler modules 290 are responsible for processing rule sets of different types, each rule handler module 290 may evaluate the rule sets associated with the particular module against the data object. Each rule handler module 290 generates a list of objects having attributes that match or correspond to the characteristics defined by the rule sets. In an example embodiment, interest management module 280 merges the lists of objects generated by the rule handler modules 290. It will be appreciated that in an example embodiment, interest management module 290 tracks which objects are needed by each node in the network using an interest subscription model and coordinates between participants so that only useful data is transferred between nodes. For example, only objects useful for a particular computing system such as a simulation server are sent to the particular system. Likewise, in an example embodiment, hubs only receive object updates that are of interest to at least one of the clients connected to it.

Referring to FIG. 3, at block 320, each computing node determines whether the evaluation has identified any data objects corresponding to rule sets. If no rule sets correspond to a data object, processing continues at block 310 where the node determines whether additional subscription rules have been received. If at block 320 it is determined that one or more rule sets correspond to data objects on a particular node, processing continues at block 322.

At block 322, the computing nodes identify the objects that, based upon the evaluation of rules to object attributes, should be communicated to another computing node. In an example embodiment, the interest management module 280 identifies that each of the objects in the list of objects generated at block 316 should be communicated to a particular object node. Each of the rule sets has data associated therewith that identifies the computing node to which the particular rules originated from. In an example embodiment, interest management module 280 stores data indicating for a particular object that corresponds to a particular rule set that the data object should be communicated to the computing system that corresponds to the particular rule set. In other words, interest management module 280 marks the node for propagation to the owner of the corresponding rule set. Referring to the example illustrated in FIG. 4B, in a scenario wherein node 120*d* determines that the characteristics of rule set 1 correspond to or match the attributes of object OR3, interest management module 130 executing on node 120*d* stores data indicating the object OR3 should be transmitted or replicated to computing node 120*a* from which rule set 1 originated. Similarly, in a scenario wherein node 120*f* determines that rule set 2 corresponds to object OR4, interest management module 130 executing on node 120*f* stores data indicating the object OR4 should be transmitted or replicated to computing node 120*d* from which rule set 2 originated.

At block 324, the nodes in the network communicate or replicates any data objects that were identified or marked at block 318. In an example embodiment, object manager module 240 replicates the identified objects to the computing nodes that correspond to the matching rule set. Referring to the example illustrated in FIG. 4B, in a scenario wherein node 120d determined that rule set 1 matched the attributes of object OR2, object manager module 240 replicates object replica OR2 to computing node 120a from which rule set 1 originated. Similarly, in a scenario wherein node 120f determines that rule set 2 corresponds to object OR4, replication management module 220 replicates object replica OR4 to computing node 120d from which rule set 2 originated. FIG. 4B comprises a chart in the lower right that illustrates matches between object replicas and rule sets owned by various nodes. In the example scenario illustrated, object replica OR3 is shown to match or correspond to rule set 1 owned by node 120a. Object replica OR4 is shown to match or correspond to rule set 2 owned by node 120d.

Figure 4C:
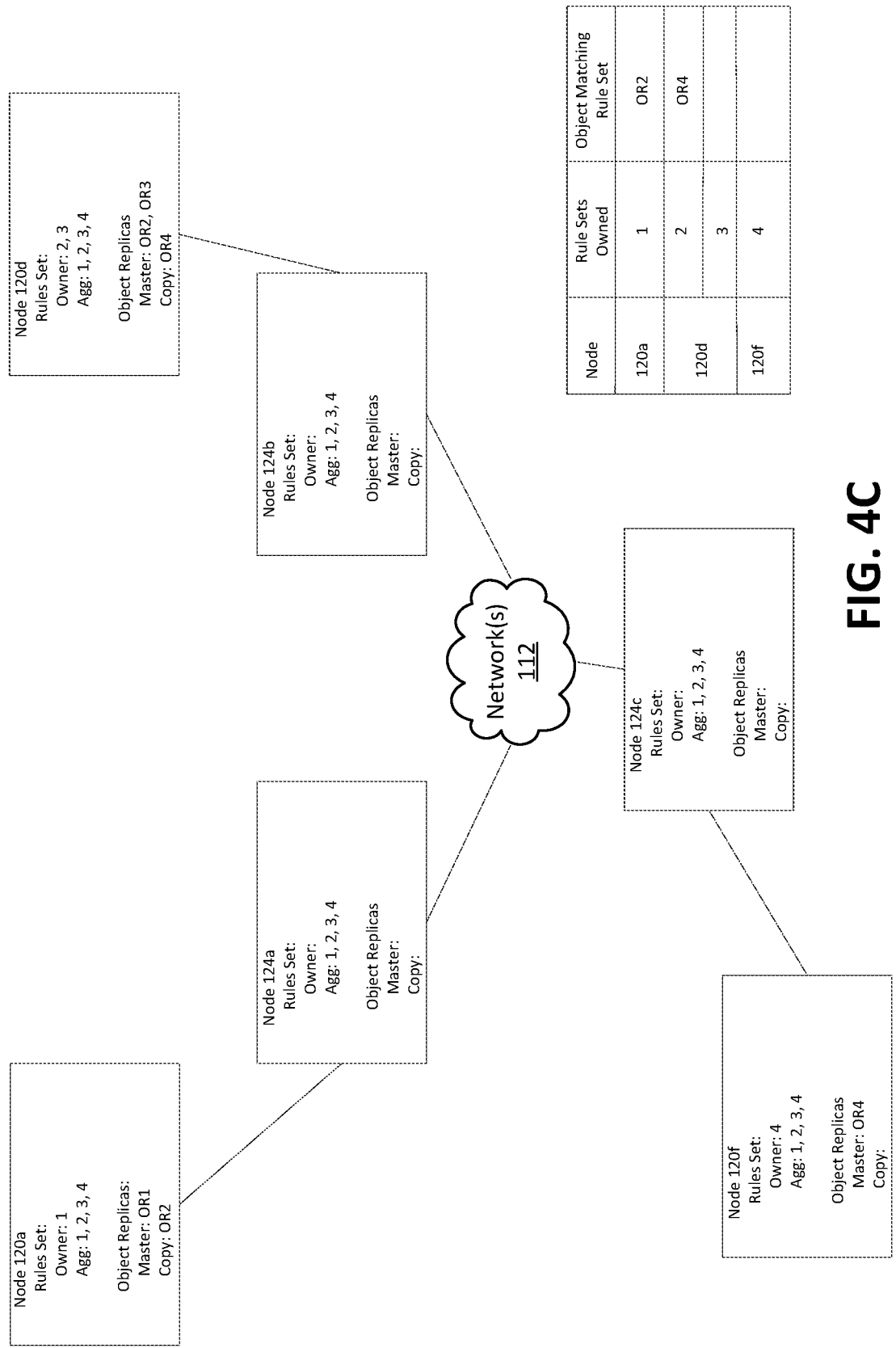

Transmission of the object replicas involves migrating the identified object replicas across the network of nodes to the designated target computing node. It will be appreciated that once an object is identified for replication to a particular node, the object is replicated across the network nodes to the relevant node. That same object need not be reevaluated by other nodes for matching against rule sets as it migrates across the network of nodes. FIG. 4C depicts an illustration of the example system of FIG. 4B as updated to reflect migration of objects to the appropriate node. In the example scenario depicted in FIG. 4C, a copy of data object OR2, which matched rule set 1, has been copied or replicated from computing node 120d to computing node 120a which owns rule set 1. Similarly, a copy of data object OR4, which matched rule set 2, has been replication from computing node 120f to computing node 120d, which owns rule set 2.

It will be appreciated that the process of receiving rules, evaluating rules against data objects, and forwarding data objects occurs continuously and dynamically. As computing nodes are added to network 110, subscription rules corresponding to the added nodes are distributed to other nodes in the network. When an existing node receives subscription rules corresponding to an added node, the existing node performs the processing described above in connection with FIG. 3 to evaluate the subscription rules against the attributes of data objects stored on the particular node. Where the subscription rules match the attributes of a data object, the particular data object is marked for forwarding to the new computing node that corresponds to the new subscription rules. Furthermore, when an existing node receives a new data object, the existing node performs the processing described above in connection with FIG. 3 to evaluate the subscription rules thereon to the attributes of the new data object. Where a subscription rule matches the attributes of the new data object, the particular data object is marked for forwarding to the computing node that corresponds to the matching subscription rule.

Accordingly, per the example processing illustrated in connection with FIGS. 3, 4A, 4B, and 4C, data objects may be dynamically distributed to those computing nodes that have a need to receive the data object. In the context of a simulation server, only data objects useful for a particular simulation server's portion of the simulation are sent to each simulation server. Hubs only receive object updates that are of interest to at least one of the user systems that are connected to the particular hub. Computing nodes receive the particular data objects that the nodes require to provide the desired services, but additional network and processing resources are not wasted on communicating data objects that are not needed.

It will be appreciated that variations of the above-described processing may be applied to address the desired functionality. For example, while the above described processing is used to replicate copies of data objects, the same or similar use of rules may be employed to transfer the ownership of a data object. For example, the rules may specify data objects that should be owned by particular computing nodes. Accordingly, when a data object is communicated pursuant to a rule, the ownership or control of the data object may also be transferred between nodes.

Example Processing Architecture

Figure 5:
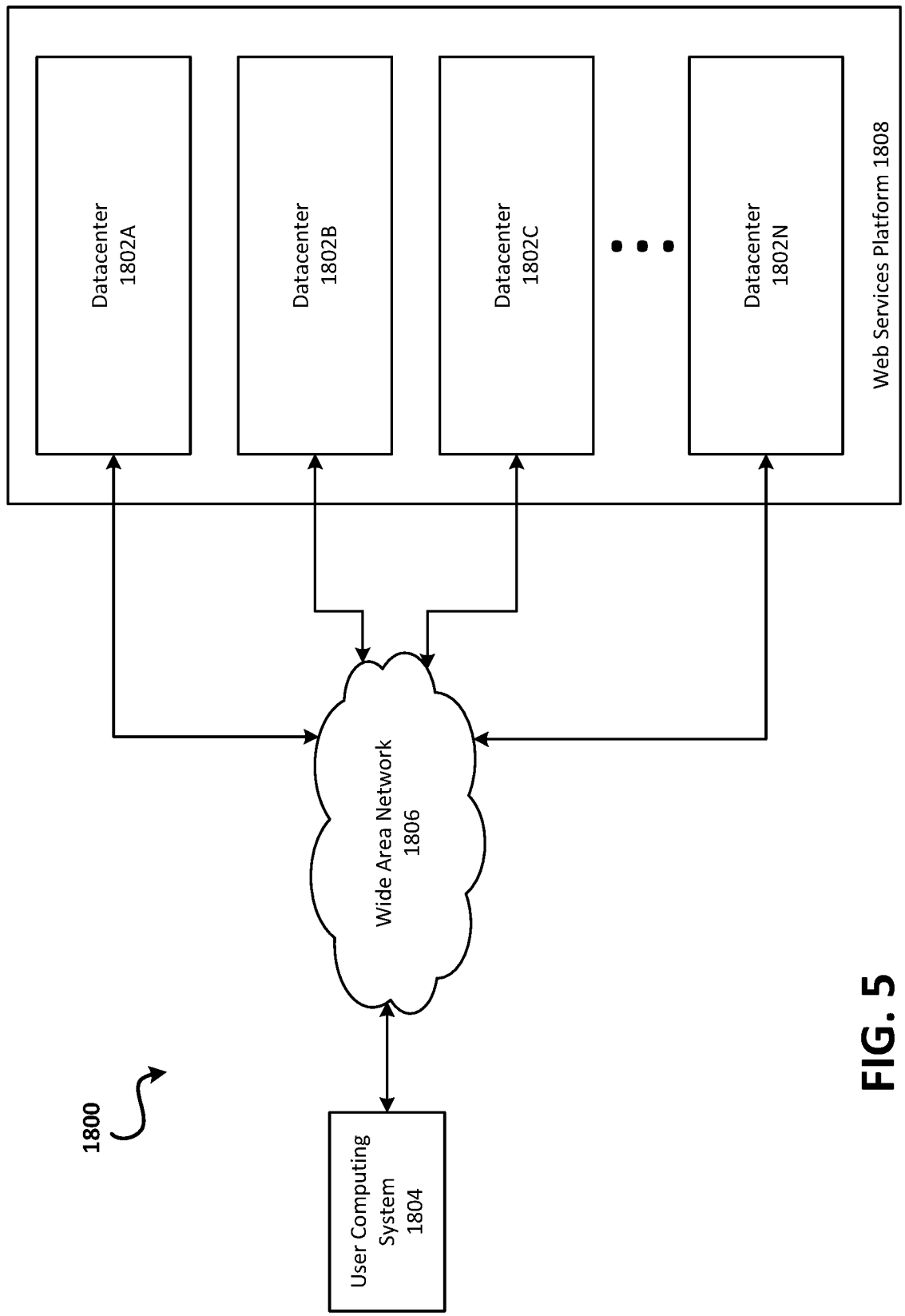
FIG. 5 depicts an example computing arrangement for implementing services accessible to an example device.
Figure 6:
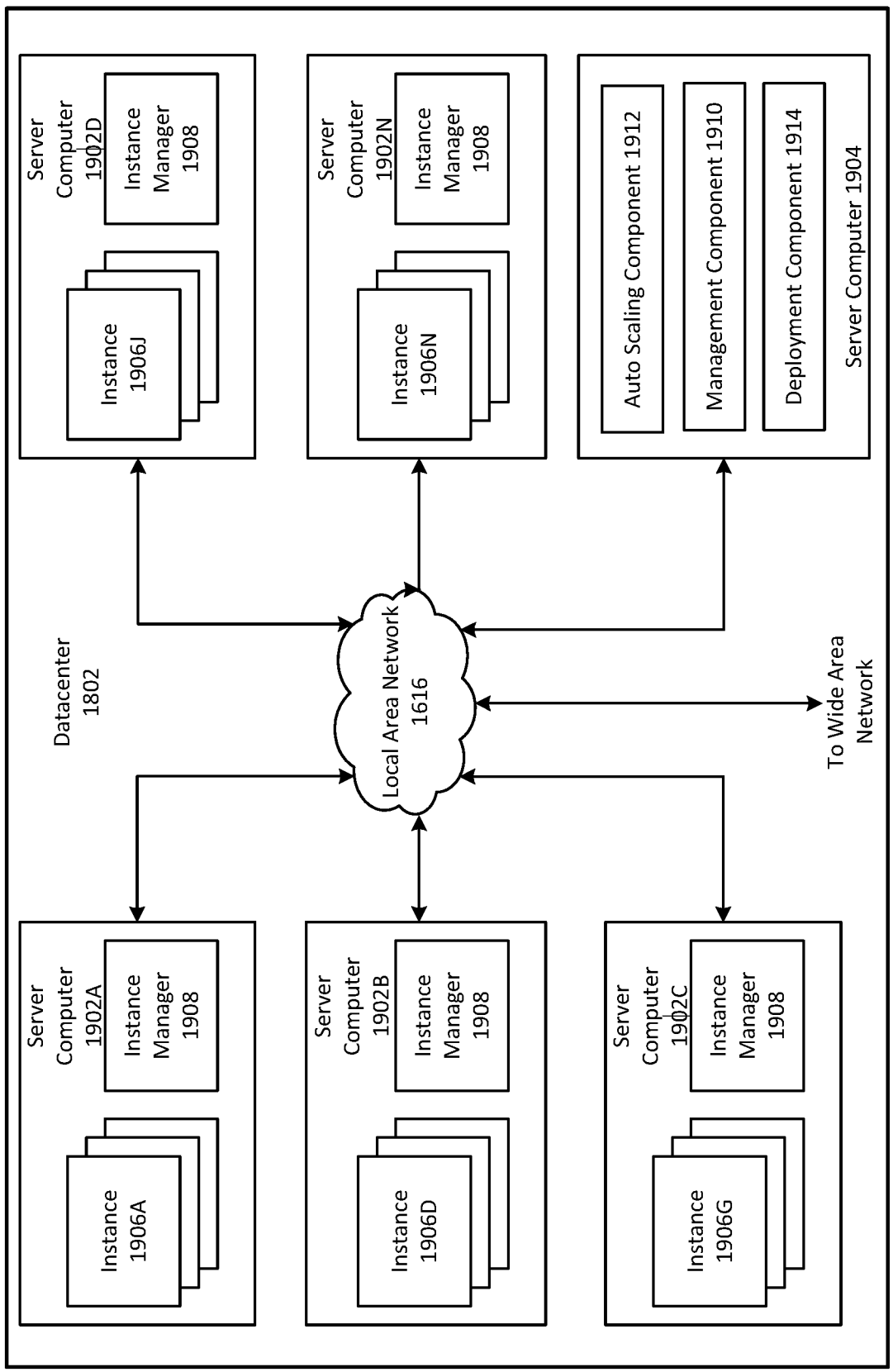
FIG. 6 depicts an example computing arrangement for implementing services accessible to an example device.

It will be appreciated that the processing described in connection with FIGS. 3, 4A, 4B, 4C may be comprised in a system architecture adapted to providing web services or cloud based services. User devices 130 may access the architecture via network 112 which may comprise the Internet and/or World Wide Web. FIGS. 5 and 6 depict example operating environments that might be used to implement an on-line service implemented using comprising system nodes 120. FIG. 5 depicts a web services platform that comprises a plurality of datacenters. FIG. 6 depicts a datacenter that comprises a plurality of computers.

Turning to the details of FIG. 5, this figure depicts an example of a suitable computing environment in which embodiments described herein may be implemented. A cloud service provider (such as web services platform 1808) may configure the illustrated computing environment to host virtual clouds of entities and to enable communication paths between these virtual clouds that may otherwise be isolated. In particular, FIG. 5 is a system and network diagram that shows an illustrative operating environment 1800 that includes a web services platform 1808 for implementing virtual clouds and for providing on-demand access to computer resources, such as virtual machine instances. Web services platform 1808 can provide computer resources for executing applications on a permanent or an as-needed basis and may be configured as a private network. These computer resources may include various types of resources, such as data processing resources, data storage resources, data communication resources, and the like. Each type of computer resource may be general-purpose or may be available in a number of specific configurations. For example, data processing resources may be available as virtual machine instances. The instances may be configured to execute applications, including web servers, application servers, media servers, database servers, and the like. Data storage resources may include file storage devices, block storage devices, and the like.

Each type or configuration of computer resource may be available in different sizes, such as large resources consisting of many processors, large amounts of memory, and/or large storage capacity, and small resources consisting of fewer processors, smaller amounts of memory, and/or smaller storage capacity. Entities may choose to allocate a number of small processing resources as web servers and/or one large processing resource as a database server, for example.

The computer resources provided by web services platform 1808 may be enabled by one or more datacenters 1802A-1802N, which may be referred herein singularly as "datacenter 1802" or in the plural as "datacenters 1802." Datacenters 1802 may be facilities that house and operate computer systems and associated components and may include redundant and backup power, communications, cooling, and security systems. Datacenters 1802 may be located in a same geographical area, such as in a same facility, and may be interconnected using private networks, such as high-speed fiber optic networks, controlled and managed by a service provider of web services platform 1808. Datacenters 1802 may also be distributed across geographically disparate locations and may be interconnected in part using public networks, such as the Internet. One illustrative configuration for datacenter 1802 that implements the concepts and technologies disclosed herein is described below with regard to FIG. 6.

Entities of web services platform 1808 may access the computer resources provided by datacenters 1802 over a Wide Area Network (WAN) 1806. Although a WAN is illustrated in FIG. 5, it should be appreciated that a Local Area Network (LAN), the Internet, or any other networking topology known in the art that connects datacenters 1802 to remote entities and other users may be utilized. It should also be appreciated that combinations of such networks may also be utilized.

An entity or other entities that are users of web services platform 1808 may utilize a computing system 1804 to access the computer resources provided by datacenters 1802. User computing system 1804 comprises a computer capable of accessing web services platform 1808, such as a server computer, a desktop or laptop personal computer, a tablet computer, a wireless telephone, a PDA, an e-reader, a game console, a set-top box, an automobile, an automobile system, a home appliance, a manufacturing device or sensor, a building control system, a farming instrument, or any other computing node or thing that is able to communicate with data center 1802. In an example scenario, computing system 1804 may correspond, for example, devices 130 described above.

In an example scenario, a particular user computing system 1804 may be utilized to configure aspects of the computer resources provided by web services platform 1808. In this regard, web services platform 1808 may provide a web interface through which aspects of its operation may be configured through the use of a web browser application program executing on user computing system 1804. Alternatively, a stand-alone application program executing on user computing system 1804 may access an application programming interface (API) exposed by web services platform 1808 for performing the configuration operations. Other mechanisms for configuring the operation of web services platform 1808, including launching new virtual machine instances on web services platform 1808, may also be utilized.

According to embodiments disclosed herein, capacities of purchased computer resources provided by web services platform 1808 can be scaled in response to demand. In this regard, scaling refers to the process of instantiating, which may also be referred to herein as "launching" or "creating," or terminating, which may also be referred to herein as "de-scaling," instances of computer resources in response to demand.

Web services platform 1808 may also be configured with a deployment component to assist entities in the deployment of new instances of computer resources. The deployment component may receive a configuration from an entity that may include data describing how new instances should be configured. For example, the configuration may specify one or more applications or software components that should be installed in new instances, provide scripts and/or other types of code to be executed in new instances, provide cache warming logic specifying how an application cache should be prepared, and other types of information. The deployment component utilizes the entity-provided configuration and cache warming logic to launch, configure, and prime new instances of computer resources.

FIG. 6 depicts a computing system diagram that illustrates one configuration for datacenter 1802 that implements web services platform 1808. The example datacenter 1802 shown in FIG. 6 may include several server computers 1902A-1902N, which may be referred herein singularly as "server computer 1902" or in the plural as "server computers 1902," for providing computer resources for hosting virtual clouds and for executing applications. Server computers 1902 may be standard tower or rack-mount server computers configured appropriately for providing the computer resources described above. For instance, in one implementation server computers 1902 may be configured to provide instances 1906A-1906N of computer resources.

Instances 1906A-1906N, which may be referred herein singularly as "instance 1906" or in the plural as "instances 1906," may be virtual machine instances. As known in the art, a virtual machine instance is an instance of a software implementation of a machine (i.e., a computer) that executes programs like a physical machine. In the example of virtual machine instances, each server 1902 may be configured to execute an instance manager 1908 capable of executing the instances. Instance manager 1908 may be a hypervisor or another type of program configured to enable the execution of multiple instances 1906 on a single server 1902, for example. As discussed above, each of instances 1906 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein may be utilized with instances of storage resources, instances of data communications resources, and with other types of resources. The embodiments disclosed herein may also execute all or a portion of an application directly on a computer system without utilizing virtual machine instances.

Datacenter 1802 shown in FIG. 6 may also include a server computer 1904 reserved for executing software components for managing the operation of datacenter 1802, server computers 1902, and instances 1906. In particular, server computer 1904 may execute a management component 1910. As discussed above, working between FIGS. 5 and 6, an entity of web services platform 1808 may utilize user computing system 1804 to access management component 1910 to configure various aspects of the operation of web services platform 1808 and instances 1906 purchased by the entity. For example, the entity may purchase instances and make changes to the configuration of the instances. The entity may also specify settings regarding how the purchased instances are to be scaled in response to demand. The entity may also provide requests to launch instances to management component 1610.

As also described briefly above, an auto scaling component 1912 may scale instances 1906 based upon rules defined by an entity of web services platform 1908. For example, auto scaling component 1912 may allow an entity to specify scale up rules for use in determining when new instances should be instantiated and scale down rules for use in determining when existing instances should be terminated.

As discussed briefly above, datacenter 1802 may also be configured with a deployment component 1914 to assist entities in the deployment of new instances 1906 of computer resources. Deployment component 1914 may receive a configuration from an entity that includes data describing how new instances 1906 should be configured. For example, the configuration may specify one or more applications that should be installed in new instances 1906, provide scripts and/or other types of code to be executed for configuring new instances 1906, provide cache warming logic specifying how an application cache should be prepared, and other types of information.

Deployment component 1914 may utilize the entity-provided configuration and cache warming logic to configure, prime, and launch new instances 1906. The configuration, cache warming logic, and other information may be specified by an entity using management component 1910 or by providing this information directly to deployment component 1914. Other mechanisms may also be utilized to configure the operation of deployment component 1914.

In the example datacenter 1802 shown in FIG. 6, an appropriate LAN 1916 may be utilized to interconnect server computers 1902A-1902N and server computer 1904. LAN 1916 may also be connected to WAN 1806 illustrated in FIG. 5. It should be appreciated that the network topology illustrated in FIGS. 5 and 6 has been greatly simplified and that many more networks and networking devices may be utilized to interconnect the various computing systems disclosed herein. Appropriate load balancing devices or software modules may also be utilized for balancing a load between each of datacenters 1802A-1802N, between each of server computers 1902A-1902N in each datacenter 1802 and between instances 1906 purchased by each entity of web services platform 1808. These network topologies and devices should be apparent to those skilled in the art.

It should be appreciated that datacenter 1802 described in FIG. 6 is merely illustrative and that other implementations may be utilized. In particular, functionality described herein as being performed by management component 1910, auto scaling component 1912, and deployment component 1914 may be performed by one another, may be performed by other components, or may be performed by a combination of these or other components. Additionally, it should be appreciated that this functionality may be implemented in software, hardware, or a combination of software and hardware. Other implementations should be apparent to those skilled in the art.

Figure 7:
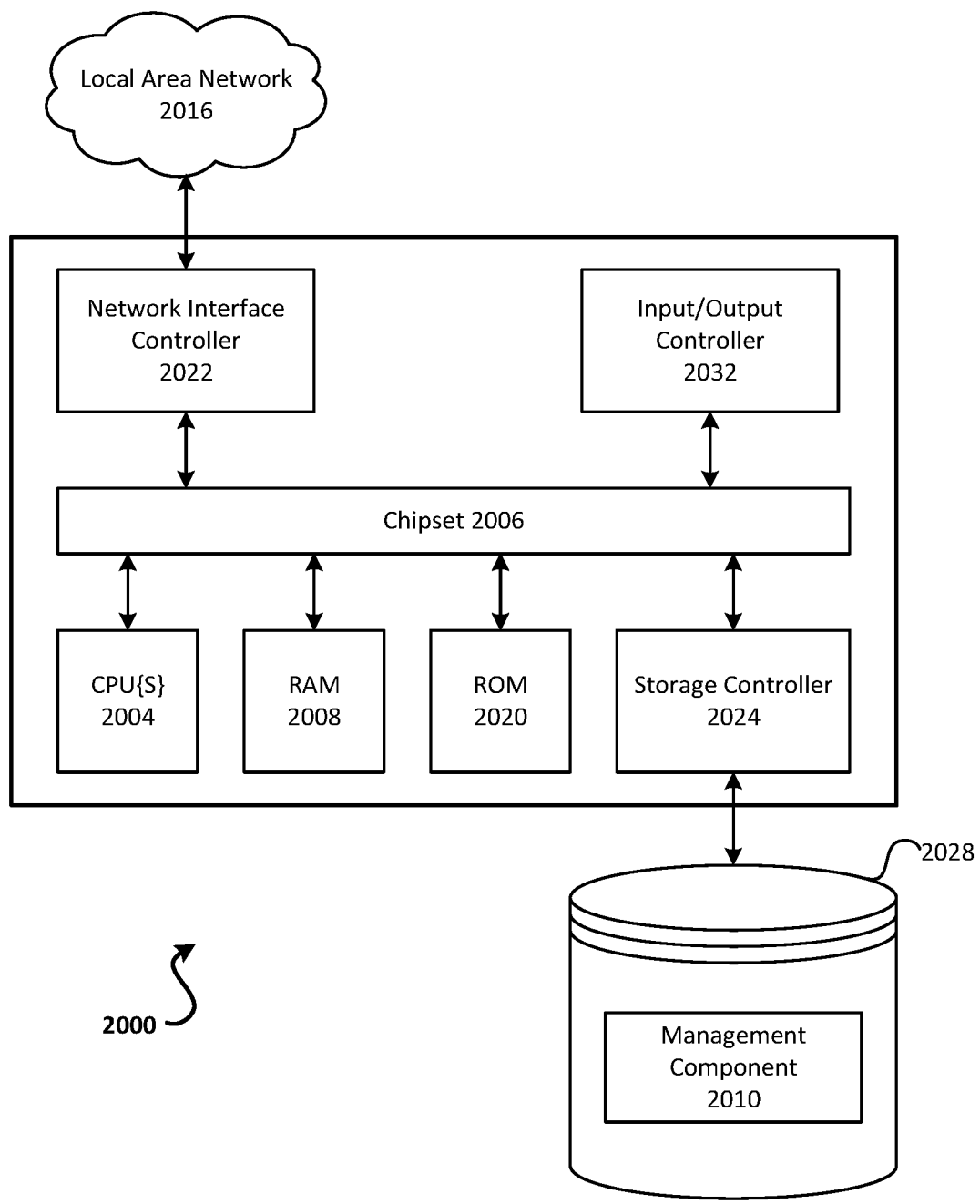
FIG. 7 depicts an example computing system that may be used in some embodiments.

FIG. 7 depicts an example computer architecture for a computing system 2000 capable of executing software for performing operations as described above in connection with FIGS. 1-6. The computer architecture shown in FIG. 7 illustrates a conventional server computer, workstation, desktop computer, laptop, tablet, network appliance, PDA, e-reader, digital cellular phone, or other computing node, and may be utilized to execute any aspects of the software components presented herein described as executing on servers 140, 142, 144, 146, 150, 220, 230, and 240, on devices 130, within datacenters 1802A-1802N, on server computers 1902A-1902N, or on any other computing system mentioned herein.

Computer 2000 may include a baseboard, or "motherboard," which is a printed circuit board to which a multitude of components or devices may be connected by way of a system bus or other electrical communication paths. One or more central processing units (CPUs) 2004 may operate in conjunction with a chipset 2006. CPUs 2004 may be standard programmable processors that perform arithmetic and logical operations necessary for the operation of computer 2000.

CPUs 2004 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

Chipset 2006 may provide an interface between CPUs 2004 and the remainder of the components and devices on the baseboard. Chipset 2006 may provide an interface to a random access memory (RAM) 2008 used as the main memory in computer 2000. Chipset 2006 may further provide an interface to a computer-readable storage medium, such as a read-only memory (ROM) 2020 or non-volatile RAM (NVRAM) (not shown), for storing basic routines that may help to start up computer 2000 and to transfer information between the various components and devices. ROM 2020 or NVRAM may also store other software components necessary for the operation of computer 2000 in accordance with the embodiments described herein.

Computer 2000 may operate in a networked environment using logical connections to remote computing nodes and computer systems through LAN 2016. Chipset 2006 may include functionality for providing network connectivity through a network interface controller (NIC) 2022, such as a gigabit Ethernet adapter. NIC 2022 may be capable of connecting the computer 2000 to other computing nodes over LAN 2016. It should be appreciated that multiple NICs 2022 may be present in computer 2000, connecting the computer to other types of networks and remote computer systems.

Computer 2000 may be connected to a mass storage device 2028 that provides non-volatile storage for the computer. Mass storage device 2028 may store system programs, application programs, other program modules, and data, which have been described in greater detail herein. Mass storage device 2028 may be connected to computer 2000 through a storage controller 2024 connected to chipset 2006. Mass storage device 2028 may consist of one or more physical storage units. Storage controller 2024 may interface with the physical storage units through a serial attached SCSI (SAS) interface, a serial advanced technology attachment (SATA) interface, a fiber channel (FC) interface, or other type of interface for physically connecting and transferring data between computers and physical storage units.

Computer 2000 may store data on mass storage device 2028 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 2028 is characterized as primary or secondary storage and the like.

For example, computer 2000 may store information to mass storage device 2028 by issuing instructions through storage controller 2024 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. Computer 2000 may further read information from mass storage device 2028 by detecting the physical states or characteristics of one or more particular locations within the physical storage units.

In addition to mass storage device 2028 described above, computer 2000 may have access to other computer-readable storage media to store and retrieve information, such as program modules, data structures, or other data. It should be appreciated by those skilled in the art that computer-readable storage media can be any available media that provides for the storage of non-transitory data and that may be accessed by computer 2000.

By way of example and not limitation, computer-readable storage media may include volatile and non-volatile, transitory computer-readable storage media and non-transitory computer-readable storage media, removable and non-removable media implemented in any method or technology. Computer-readable storage media includes, but is not limited to, RAM, ROM, erasable programmable ROM (EPROM), electrically erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage, other magnetic storage devices, or any other medium that can be used to store the desired information in a non-transitory fashion.

Mass storage device 2028 may store an operating system utilized to control the operation of the computer 2000. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. Mass storage device 2028 may store other system or application programs and data utilized by computer 2000, such as management component 2010 and/or the other software components described above.

Mass storage device 2028 or other computer-readable storage media may also be encoded with computer-executable instructions, which, when loaded into computer 2000, transforms the computer from a general-purpose computing system into a special-purpose computer capable of implementing the embodiments described herein. These computer-executable instructions transform computer 2000 by specifying how CPUs 2004 transition between states, as described above. Computer 2000 may have access to computer-readable storage media storing computer-executable instructions, which, when executed by computer 2000, may perform operating procedures described above in connection with FIGS. 1-4.

Computer 2000 may also include an input/output controller 2032 for receiving and processing input from a number of input devices, such as a keyboard, a mouse, a touchpad, a touch screen, an electronic stylus, or other type of input device. Similarly, input/output controller 2032 may provide output to a display, such as a computer monitor, a flat-panel display, a digital projector, a printer, a plotter, or other type of output device. It will be appreciated that computer 2000 may not include all of the components shown in FIG. 7, may include other components that are not explicitly shown in FIG. 7, or may utilize an architecture completely different than that shown in FIG. 7.

As described herein, a computing node may be a physical computing node, such as computer 2000 of FIG. 7. A computing node may also be a virtual computing node, such as a virtual machine instance, or a session hosted by a physical computing node, where the computing node is configured to host one or more sessions concurrently.

It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

Networks established by or on behalf of an entity, such as a company or organization, to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment, and the like, that may be used to implement and distribute the infrastructure and services offered by the provider network. The resources may in some embodiments be offered to clients in units called "instances," such as virtual or physical compute instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages, such as Ruby, Perl, Python, C, C++, and the like or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors and with various installed software applications, runtimes, and the like. Instances may further be available in specific availability zones, representing a data center or other geographic location of the underlying computing hardware, for example.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

The provider network may make instances available "on-demand," allowing a customer to select a number of instances of a specific type and configuration (e.g. size, platform, tenancy, availability zone, and the like) and quickly launch the instances for deployment. On-demand instances may further be added or removed as needed, either manually or automatically through auto scaling, as demand for or capacity requirements changes over time. The customer may incur ongoing usage costs related to their on-demand instances, based on the number of hours of operation and/or the actual resources utilized, for example.

The computing resource provider may also make reserved instances available to the customer. Reserved instances may provide the customer with the ability to reserve a number of a specific type and configuration of instances for a fixed term, such as one year or three years, for a low, upfront cost in exchange for reduced hourly or other usage costs, for example, if and when the instances are launched. This may allow the customer to defer costs related to scaling up the deployed application in response to increase in demand, while ensuring that the right resources will be available when needed. While reserved instances provide customers with reliable, stand-by capacity for scaling of their application, purchasing reserved instances may also lock the customer into a specific number, type, and/or configuration of computing resource in a specific availability zone for a longer period than desired. If the technical architecture or needs of the application change, the customer may not be able to realize a return on the customer's investment in the reserved instances.

Operators of such provider networks may in some instances implement a flexible set of resource reservation, control, and access interfaces for their clients. For example, a resource manager of the provider network may implement a programmatic resource reservation interface (e.g., via a web site or a set of web pages) that allows clients to learn about, select, purchase access to and/or reserve resource instances. In some embodiments discussed below where an entity, such as a resource manager or a pricing optimizer, is described as implementing one or more programmatic interfaces, such as a web page or an API, an interface manager subcomponent of that entity may be responsible for the interface-related functionality. In many embodiments equivalent interface-related functionality may be implemented by a separate or standalone interface manager, external to the resource manager and the pricing optimizer. Such an interface may include capabilities to allow browsing of a resource catalog and details and specifications of the different types or sizes of resources supported and the different reservation types or modes supported, pricing models, and so on.

The provider network may support several different purchasing modes (which may also be referred to herein as reservation modes) corresponding to some of the instance types described above. For example, the provider network may support long-term reservations, on-demand resource allocations, or spot-price-based resource allocations. Using the long-term reservation mode, a client may make a low, one-time, upfront payment for a resource instance, reserve it for a specified duration, such as a one- or three-year term, and pay a low hourly rate for the instance; the client would be assured of having the reserved instance available for the term of the reservation. Using the on-demand mode, a client could pay for capacity by the hour (or some appropriate time unit), without any long-term commitments or upfront payments. In the spot-price mode, a client could specify the maximum price per unit of time that it is willing to pay for a particular type of resource, and if the client's maximum price exceeded a dynamic spot price determined at least in part by supply and demand, then that type of resource would be provided to the client. In some embodiments, dynamically resizable pools of resource instances may be set aside for the different reservation types or modes—e.g., long-term reserved instances may be allocated from one pool, on-demand instances from another, and so on. During periods when the supply of the requested resource type exceeded the demand, the spot price may become significantly lower than the price for the on-demand mode. In some implementations, if the spot price increases beyond the maximum bid specified by a client, a resource allocation may be interrupted—i.e., a resource instance that was previously allocated to the client may be reclaimed by the resource manager and may be allocated to some other client that is willing to pay a higher price. Other purchasing modes or combinations of modes may be implemented by the resource manager in some embodiments.

It will be appreciated that while illustrative embodiments have been disclosed, the scope of potential embodiments is not limited to those explicitly described. For example, while the concepts are described with reference to requests received to perform particular types of functions or commands, the envisioned embodiments extend to processing involving any and all types of functions and commands. Similarly, while the concepts are described with reference to particular protocols and formats, the envisioned embodiments extend to processing involving any and all types of protocols and formats.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
   a first computing node in communication with a plurality of computing nodes;
   at least one memory in communication with the first computing node and having stored thereon instructions that upon execution by the first computing node cause the first computing node at least to:
   processing a set of rules received from a third computing node, the set of rules being associated with a second computing node and including information defining characteristics of data objects;

identify at least one stored data object by comparing the information defining characteristics included in the set of rules to characteristics of the at least one stored data object; and communicate the identified at least one data object stored on the first computing node to the third computing node for distribution to the second computing node.

2. The system as recited in claim 1 wherein the at least one memory in communication with the first computing node further having stored thereon instructions that upon execution by the first computing node cause the first computing node at least to:

processing a second set of rules received from a fourth computing node, the second set of rules being associated with a fifth computing node and including information defining characteristics of data objects;

identify at least one other stored data object by comparing the information defining characteristics included in the second set of rules received from the fourth computing node to characteristics of the at least one other stored data object; and communicate the identified at least one other data object stored on the first computing node to the fourth computing node for distribution to the fifth computing node while not communicating the at least one other data object to the third computing node.

3. The system as recited in claim 1 wherein the at least one memory in communication with the first computing node having stored thereon instructions that upon execution by the first computing node cause the first computing node at least to communicate the identified at least one data object stored on the first computing node to the third computing node by replication.

4. The system as recited in claim 1 wherein the at least one memory in communication with the first computing node having stored thereon instructions that upon execution by the first computing node cause the first computing node at least to communicate the identified at least one data object stored on the first computing node to the third computing node by replication comprises sending messages containing changes to a replica of the at least one data object.

5. The system as recited in claim 1 wherein a rule defines a bit map characteristic and wherein the first computing node determines whether the at least one stored data object corresponds to the bit map characteristic.

6. The system as recited in claim 1 wherein the plurality of computing nodes are arranged in a hub and spoke network configuration.

7. The system as recited in claim 1 wherein the at least one data object comprises simulation data.

8. A method comprising:

receiving at a first computing node among a plurality of computing nodes a set of rules from a third computing node, the set of rules being associated with a second computing node and including information defining characteristics of data objects;

identify at least one stored data object by comparing the information defining characteristics included in the set of rules to characteristics of the data objects; and communicate the identified at least one data object stored on the first computing node to the third computing node for distribution to the second computing node.

9. The method as recited in claim 8 further comprising:

receiving a second set of rules from a fourth computing node, the second set of rules being associated with a fifth computing node and including information defining characteristics of data objects;

identifying at least one other stored data object by comparing the information defining characteristics included in the second set of rules received to characteristics of the data objects; and communicating the identified at least one other data object stored on the first computing node to the fourth computing node for distribution to the fifth computing node while not communicating the at least one other data object to the third computing node.

10. The method as recited in claim 8 wherein communicating the identified at least one data object stored on the first computing node to the third computing node comprises replicating the at least one identified object.

11. The method as recited in claim 10 wherein replicating the at least one identified object comprises sending messages containing changes to a computing node comprising a replica of the at least one data object.

12. The method as recited in claim 8 wherein a rule comprises characteristics of a bit map, and wherein identify at least one stored data object comprises determining whether the data object corresponds to at least one characteristic of the bit map.

13. The system as recited in claim 8 wherein the plurality of computing nodes are arranged in a peer-to-peer network configuration.

14. The system as recited in claim 8 wherein the at least one data object comprises simulation data.

15. A non-transitory computer-readable medium having stored thereon computer readable instruction that upon execution perform the operations comprising:

processing at a first computing node forming a network with a plurality of computing nodes a set of rules from a third computing node in the network, the set of rules being associated with a second computing node and including information defining characteristics of data objects;

comparing the information defining characteristics included in the set of rules to characteristics of the data objects to identify at least one stored data object; and send the identified at least one data object stored on the first computing node to the third computing node for distribution to the second computing node.

16. The non-transitory computer-readable medium as recited in claim 15 having stored thereon computer readable instruction that upon execution perform the operations further comprising:

processing at the first computing node a second set of rules, the second set of rules and including information defining characteristics of data objects;

comparing the information defining characteristics included in the second set of rules to characteristics of the data objects to identify at least one other stored data object; and communicating the identified at least one other data object stored on the first computing node to a fourth computing node for distribution to a fifth computing node based on an association between the second set of rules and the fifth computing node and not communicating the at least one other data object to the third computing node.

17. The non-transitory computer-readable medium as recited in claim 15 wherein the computer readable instruction that upon execution perform the operations communicating the identified at least one data object stored on the first computing node to the third computing node further comprises the operation of replicating the at least one identified object.

18. The non-transitory computer-readable medium as recited in claim 17 wherein the computer readable instruction that upon execution perform the further operations of replicating the at least one identified object comprises the operation of sending messages containing changes to a computing node comprising a replica of the at least one data object.

19. The non-transitory computer-readable medium as recited in claim 15 wherein a rule comprises characteristics of a bit map, and wherein the operation of comparing the information defining characteristics comprises the operation of determining whether the at least one stored data object corresponds to at least one characteristic of the bit map.

20. The non-transitory computer-readable medium as recited in claim 15 having stored thereon computer readable instruction that upon execution perform the operations further comprising:
   comparing the information defining characteristics included in a second set of rules to characteristics of the at least one stored data object to identify that the at least one stored data object is associated with the second set of rules; and
   distributing the at least one stored data object to a fifth computing node based on an association between the second set of rules and the fifth computing node.

* * * * *